(12) United States Patent
Hecht

(10) Patent No.: US 6,481,936 B1
(45) Date of Patent: Nov. 19, 2002

(54) CUTTING INSERT POCKET

(75) Inventor: Gil Hecht, Nahariya (IL)

(73) Assignee: Iscar Ltd., Tefen (IL)

( * ) Notice: Subject to any disclaimer, the term of this patent is extended or adjusted under 35 U.S.C. 154(b) by 57 days.

(21) Appl. No.: 09/635,354

(22) Filed: Aug. 9, 2000

(30) Foreign Application Priority Data

Aug. 18, 1999 (IL) ............................................. 131463

(51) Int. Cl.[7] ............................. B23B 29/04; B26D 1/00
(52) U.S. Cl. ...................... 407/111; 407/104; 407/106; 407/108
(58) Field of Search ................ 407/66, 71, 72, 407/73, 77, 81, 83, 84, 85, 90, 103, 104, 106, 107, 108, 120, 111

(56) References Cited

U.S. PATENT DOCUMENTS

| 2,966,968 | A | * | 1/1961 | Skeel | 403/370 |
| 4,264,245 | A | * | 4/1981 | Lindsay | 407/41 |
| 4,283,163 | A | * | 8/1981 | Grafe et al. | 407/104 |
| 4,533,283 | A | * | 8/1985 | Satran et al. | 407/111 |
| 4,876,932 | A | * | 10/1989 | Nessel | 82/158 |
| 5,443,334 | A | * | 8/1995 | Pantzar | 407/113 |
| 6,126,366 | A | * | 10/2000 | Lundblad | 407/102 |
| 6,244,789 | B1 | * | 6/2001 | Tsuda | 407/107 |

FOREIGN PATENT DOCUMENTS

EP          0 184 818 B1       12/1985

* cited by examiner

*Primary Examiner*—Henry Tsai
(74) *Attorney, Agent, or Firm*—Pennie & Edmonds LLP (57) ABSTRACT

The present invention provides a cutting insert pocket in a cutting insert holder for securely retaining a cutting insert. The cutting insert pocket is provided with a base and two angularly disposed insert support sidewalls transverse to the base. A first of the two insert support sidewalls being fixed relative to the base and having two coplanar spaced apart insert location surfaces, a second of the two insert support sidewalls being rotatable about an axis transverse to the base and having two coplanar spaced apart insert location surfaces. This arrangement enables four-point location of the cutting insert in the cutting insert pocket, instead of the usual prior art three-point location.

25 Claims, 5 Drawing Sheets

CUTTING INSERT POCKET

FIELD OF THE INVENTION

This invention relates to a cutting insert pocket in a cutting insert holder that provides precise location of a cutting insert retained therein.

BACKGROUND OF THE INVENTION

In the prior art a cutting insert pocket in a cutting insert holder generally comprises two angularly disposed sidewalls and a base transverse thereto. Normally, one of the sidewalls has one insert location surface and the other sidewall has two coplanar insert location surfaces. The three insert location surfaces define the position of a cutting insert retained in the cutting insert pocket.

A known disadvantage of this mode of insert retention is the lack of repeatability of location of the cutting insert, and therefore of the cutting insert's operative cutting edge. That is, when indexing or replacing a cutting insert there is no certainty that the new operative cutting edge will be located in the same position, with respect to the cutting insert holder, as the previous operative cutting edge. A further disadvantage is the possible moving of the cutting edge to a new location due to a change in direction of the cutting forces acting on the cutting insert.

It is an object of the present invention to provide a cutting insert pocket that substantially overcomes the above mentioned disadvantages.

It is also an object of the present invention to provide a method for assembling a cutting tool assembly comprising a cutting insert and a cutting insert holder having a cutting insert pocket in accordance with the present invention.

SUMMARY OF THE INVENTION

In accordance with the present invention there is provided a cutting insert pocket in a cutting insert holder comprising:

two insert support sidewalls and a base transverse thereto, a first of the two insert support sidewalls being fixed relative to the base and having two coplanar spaced apart insert location surfaces, a second of the two insert support sidewalls being rotatable about an axis transverse to the base and having two coplanar spaced apart insert location surfaces, the two insert support sidewalls being angularly disposed to one another, the second insert support sidewall being the inner surface of a slidably rotatable member, the slidably rotatable member having an outer surface opposite an inner surface.

In accordance with the present invention, the outer surface of the slidably rotatable member has an arcuate portion and the cutting insert holder has a fixed inner wall adjacent the outer surface of the slidably rotatable member, the fixed inner wall having at least two spaced apart abutment surfaces, the arcuate portion of the outer surface of the slidably rotatable member being in abutment with the at least two spaced apart abutment surfaces enabling slidable rotational movement of the slidably rotatable member relative to the fixed inner wall of the cutting insert holder.

In accordance with one embodiment of the present invention, the outer surface of the slidably rotatable member has an arcuate portion with a first radius of curvature and the cutting insert holder has a fixed inner wall adjacent the outer surface of the slidably rotatable member, the fixed inner wall having an arcuate portion with a second radius of curvature, the arcuate portion of the outer surface of the slidably rotatable member being in abutment with the arcuate portion of the fixed inner wall enabling slidably rotational movement of the slidably rotatable member relative to the fixed inner wall of the cutting insert pocket.

In accordance with a preferred embodiment, the first radius of curvature is larger than the second radius of curvature.

Preferably, the arcuate portion of the outer surface of the slidably rotatable member is convex and the arcuate portion of the fixed inner wall is concave.

If desired, the arcuate portion of the outer surface of the slidably rotatable member is concave and the arcuate portion of the fixed inner wall is convex.

In accordance with the present invention, the slidably rotatable member is provided with a through bore and the base of the cutting insert pocket is provided with a bore, the slidably rotatable member being attached to the base of the cutting insert pocket by means of a pin which passes through the through bore and which projects from the slidably rotatable member into the bore.

In accordance with a preferred embodiment of the present invention, the bore in the base of the cutting insert pocket has a first diameter and the through bore in the slidably rotatable member has a second diameter, the first diameter being greater than the second diameter.

In accordance with the present invention there is also provided a cutting tool assembly comprising a cutting insert holder having a cutting insert pocket and a cutting insert retained therein, the cutting insert having at least two angularly disposed insert peripheral side surfaces, the cutting insert pocket comprising:

a slidably rotatable member having an inner surface and an opposite outer surface;

two insert support sidewalls and a base transverse thereto, a first of the two insert support sidewalls being fixed relative to the base and having two coplanar spaced apart insert location surfaces, a second of the two insert support sidewalls being slidably rotatable relative to a fixed inner wall of the cutting insert pocket and having two coplanar spaced apart insert location surfaces, the fixed inner wall being adjacent the outer surface of the slidably rotatable member, the two insert support sidewalls being angularly disposed to one another, the second insert support sidewall being the inner surface of the slidably rotatable member;

wherein the cutting insert is retained in the cutting insert pocket with the two coplanar spaced apart insert location surfaces of the first insert support sidewall abutting one insert peripheral side surface and the two coplanar spaced apart insert location surfaces of the second insert support sidewall abutting the other insert peripheral side surface, the slidably rotatable member being fixed in position between the cutting insert and the fixed inner wall adjacent the outer surface of the slidably rotatable member.

The is also provided in accordance with the present invention, a method for assembling a cutting tool assembly comprising a cutting insert holder and a cutting insert, comprising the steps of:

(i) providing a cutting insert holder having a cutting insert pocket, the cutting insert pocket comprising:

a slidably rotatable member having an inner surface and an opposite outer surface;

two insert support sidewalls and a base transverse thereto, a first of the two insert support sidewalls being fixed relative to the base and having two coplanar spaced apart insert location surfaces, a second of the two insert support sidewalls being slidably rotatable relative to a fixed inner wall of the cutting insert pocket and having two coplanar spaced apart insert location surfaces, the fixed inner wall being adjacent the outer surface of the slidably rotatable member, the two insert support sidewalls being angularly disposed to one another, the second insert support sidewall being the inner surface of the slidably rotatable member, the two insert support sidewalls being angularly disposed to one another at a first angular disposition;

(ii) providing a cutting insert to be retained in the cutting insert holder, the cutting insert having at least two angularly disposed insert peripheral side surfaces being disposed at a second angular disposition;

(iii) positioning the cutting insert in the cutting insert pocket with the two coplanar spaced apart insert location surfaces of the first insert support sidewall adjacent one insert peripheral side surface and the two coplanar spaced apart insert location surfaces of the second insert support sidewall adjacent the other insert peripheral side surface;

(iv) inserting a clamping screw in a through bore in the cutting insert until the clamping screw mates with a threaded bore in the base of the cutting insert pocket;

(v) screwing the clamping screw into the threaded bore in the base of the cutting insert pocket, whereby the slidably rotatable member becomes fixed in position between the cutting insert and the fixed inner wall adjacent the outer surface of the slidably rotatable member and the two coplanar spaced apart insert location surfaces of the first insert support sidewall abut one insert peripheral side surface and the two coplanar spaced apart insert location surfaces of the second insert support sidewall abut the other insert peripheral side surface.

BRIEF DESCRIPTION OF THE DRAWINGS

For a better understanding the invention will now be described, by way of example only, with reference to the accompanying drawings in which.

DETAILED DESCRIPTION OF THE INVENTION

In the following description, a cutting insert pocket is described with reference to figures showing a forward portion of a turning tool. It will be appreciated that the invention is not restricted to turning tools but relates to cutting insert pockets in cutting tools in general. However, as will be pointed out below, the invention only relates to cutting insert pockets having angularly disposed insert support sidewalls. The present invention does not relate to cutting insert pockets that have parallelly disposed insert support sidewalls. More specifically, and as will be described below the present invention does not relate to cutting insert pockets having parallelly disposed insert support sidewalls where one of the insert support sidewalls is rotatable. This being the case, reference is made in the description and claims to angularly disposed insert support sidewalls. As defined herein, angularly disposed insert support sidewalls have an angular disposition between the sidewalls such as to exclude parallelly disposed insert support sidewalls.

Figure 1:
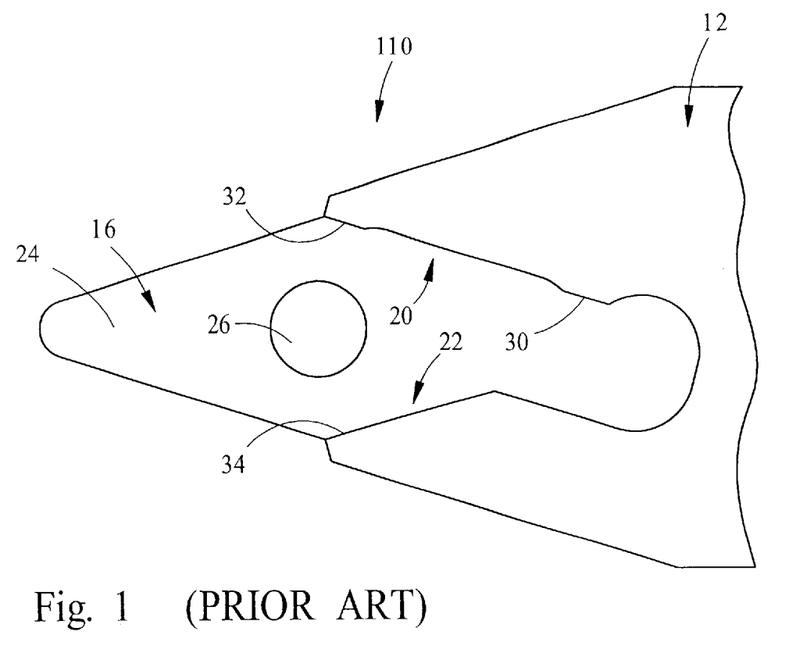
FIG. 1 is a top view of a cutting insert pocket of a prior art cutting insert holder.
Figure 2:
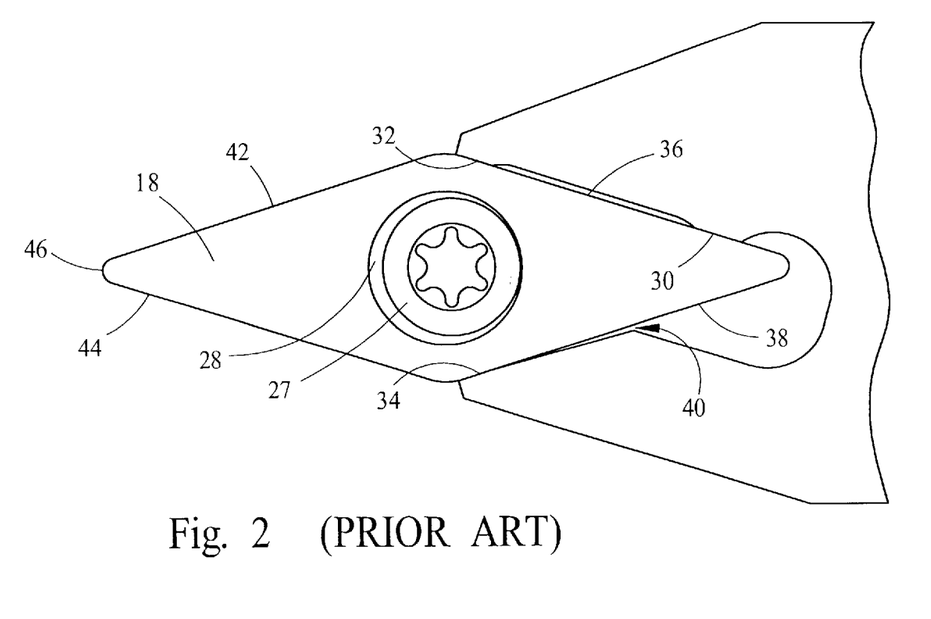
FIG. 2 is a top view of the cutting insert pocket of FIG. 1 with a cutting insert retained therein.

Attention is first drawn to FIGS. 1 and 2. FIG. 1 shows a prior art cutting insert holder 110 comprising a body portion 12 having a cutting insert pocket 16 for retaining a cutting insert 18 therein. The cutting insert pocket 16 comprises a first insert support sidewall 20, a second insert support sidewall 22 and a base 24 transverse thereto. The base is provided with a threaded bore 26 for receiving a clamping screw 27, which is received in a through bore 28 in the cutting insert, for securing the cutting insert 18 in the cutting insert pocket 16. As will be appreciated from the description of the invention as given herein below, whilst a securing member, such as a clamping screw, is required in order to secure the cutting insert 18 in the cutting insert pocket 16, the invention is not restricted to the use of a screw and any appropriate alternative securing member, such as a pin or a lever, can be used.

The first insert support sidewall 20 has two coplanar spaced apart insert location surfaces, a rear insert location surface 30 and a forward insert location surface 32. It is well known in the art that it is preferable not to design the second insert support sidewall 22 with two coplanar spaced apart insert location surfaces, since in such a case there would be, all in all, four location surfaces giving rise to a generally ill defined cutting insert location system. In order to better define the location of the cutting insert, the cutting insert pocket 16 is so designed that when the cutting insert 18 is secured therein the cutting insert abuts the second insert support sidewall 22 at a forward region 34 thereof This is done by designing the angle between the insert support sidewalls 20, 22 to be slightly smaller that the angle between adjacent abutted insert peripheral side surfaces 36, 38. With this design, the rear and forward insert location surfaces 30, 32 of the first insert support sidewall 20 abut the first insert peripheral side surface 36, whereas a clearance 40 is formed between the rear of the second insert support sidewall 22 and the second insert peripheral side surface 38. The location of the cutting insert, and hence the location of the cutting insert's cutting edges 42, 44 and cutting corner 46, is therefore defined by three regions of contact between the cutting insert pocket and the peripheral side surfaces of the cutting insert at the two insert location surfaces 30, 32 of the first insert support sidewall 20 and the forward region 34 of the second insert support sidewall 22.

The retained cutting insert 18 shown in FIG. 2 will maintain its initial secured position as long as no lateral cutting forces are applied to the cutting edge 44. If lateral cutting forces are applied to the cutting edge 44 then the cutting insert may well rotate around the insert location surface 32 thereby decreasing the clearance 40. Such a situation is clearly undesirable since the location of the cutting insert's cutting edges 42, 44 and cutting corner 46 will be changed from their initial location.

Figure 3:
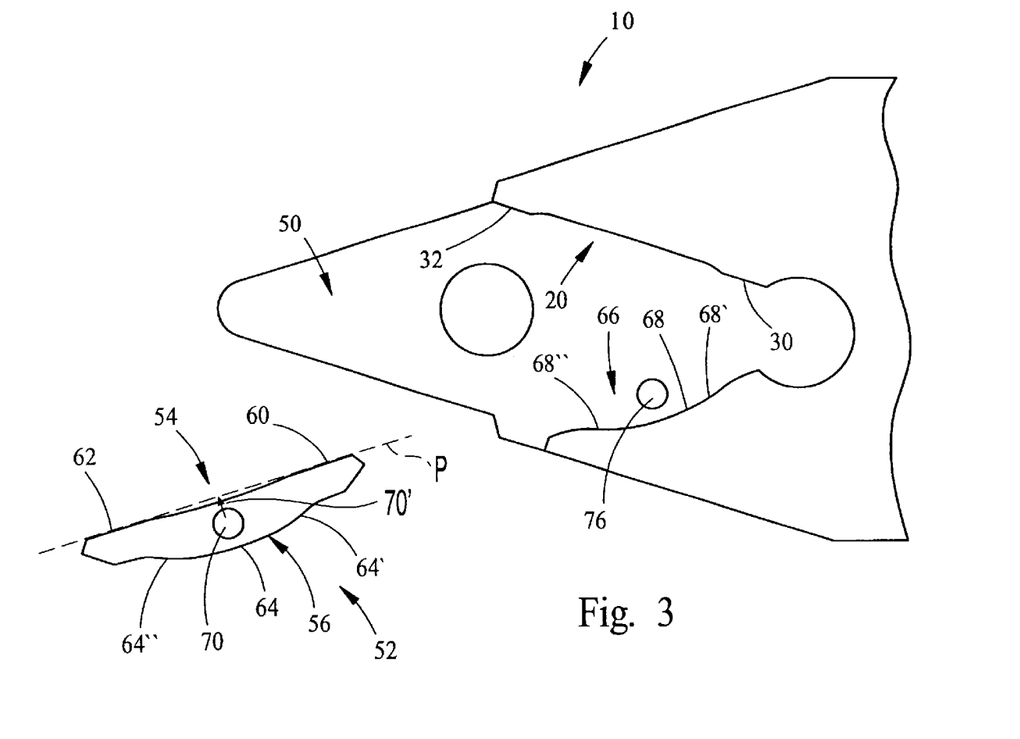
FIG. 3 is an exploded top view of the cutting insert pocket of a cutting insert holder in accordance with a first embodiment of the present invention.

Attention is now drawn to FIGS. 3 to 8, illustrating a cutting insert pocket 50 in accordance with the present invention. The cutting insert pocket 50 comprises two insert support sidewalls 20, 58 and a base 24 transverse thereto. The two insert support sidewalls are angularly disposed to one another. The first insert support sidewall 20 is the same as in FIGS. 1 and 2 and is fixed relative to the base 24. The insert support sidewall 20 has two coplanar spaced apart insert location surfaces 30 and 32. The second insert support sidewall 58 is the inner surface 54 to a slidably rotatable member 52 and has two coplanar spaced apart insert location surfaces, a rear insert location surface 60 and a front insert location surface 62. The slidably rotatable member 52 has an outer surface 56, opposite the inner surface 54, and a top surface 53, opposite a bottom surface 55. And, as seen in FIG. 3, the slidably rotatable member 52 preferably also has a through bore 70 that is offset from an imaginary plane P containing the rear 60 and front 62 insert location surfaces, a projection 70' of the through bore 70 on the imaginary plane P falling between the two-spaced apart insert location surfaces 60, 62. Clearly, therefore, the second insert support sidewall 58, being the inner surface 54 of the slidably rotatable member 52, is rotatable relative to the base 24.

Figure 4:
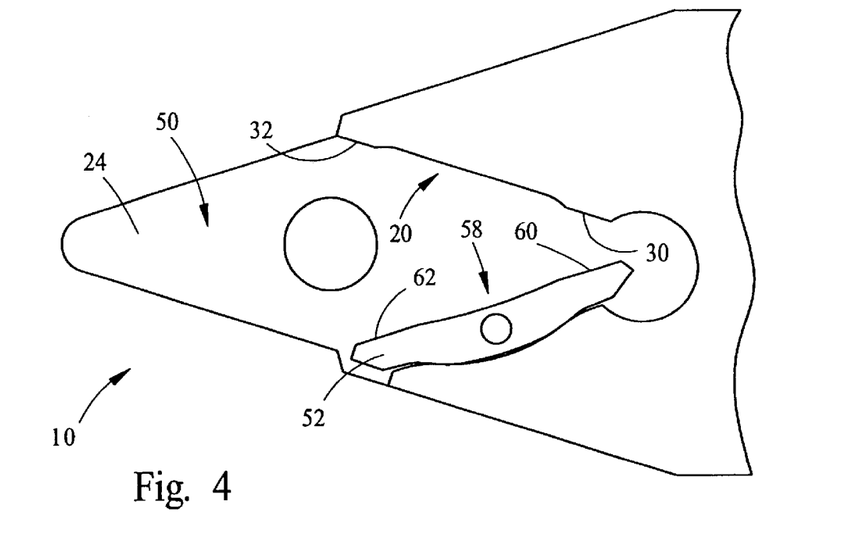
FIG. 4 is a top view of the cutting insert pocket of a cutting insert holder in accordance with a first embodiment of the present invention.
Figure 5:
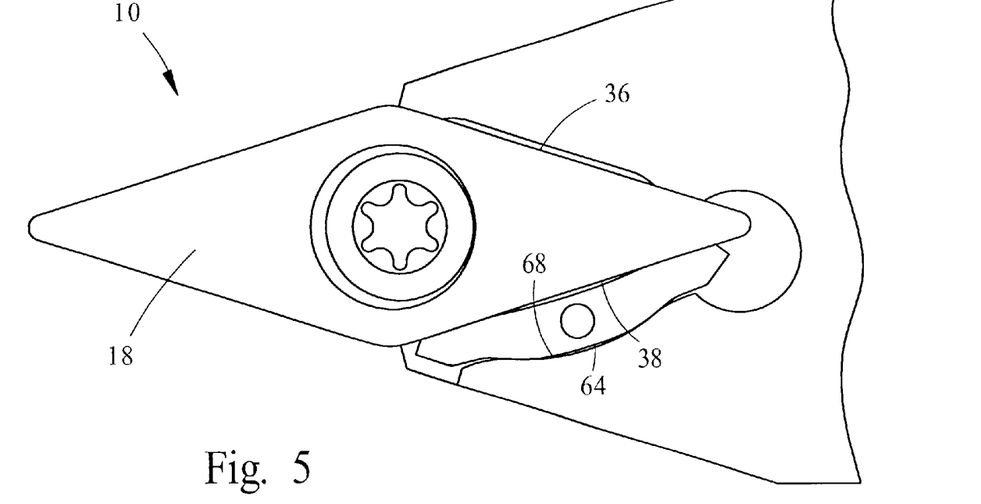
FIG. 5 is a top view of the cutting insert pocket of the cutting insert holder of FIG. 4 with a cutting insert retained therein.

In accordance with the present invention, the outer surface of the slidably rotatable member 52 has an arcuate portion 64 and the cutting insert pocket 50 has a fixed inner wall 66 adjacent the outer surface 56 of the slidably rotatable member 52. The bottom 55 of the slidably rotatable member 52 abuts the base 24 of the cutting insert pocket 50. The fixed inner wall 66 has an arcuate portion 68 complementary to the arcuate portion 64 of the outer surface 56 of the slidably rotatable member 52, the arcuate portion 64 of the outer surface 56 of the slidably rotatable member 52 being in abutment with the arcuate portion 68 of the fixed inner wall 66 enabling slidable movement of the slidably rotatable member 52 relative to the fixed inner wall 66 of the cutting insert pocket 50.

As shown in the embodiment in FIGS. 3 to 5, the arcuate portion 64 of the outer surface 56 of the slidably rotatable member 52 is convex and the arcuate portion 68 of the fixed inner wall 66 is concave. The arcuate portions 64, 68 are preferably circular arcs in a top view. In other words, each arcuate portion 64, 68 is preferably a portion of the cylindrical surface of a circular cylinder with the longitudinal axis of the cylinder being perpendicular to the base 24 of the cutting insert pocket 50. Preferably, the arcuate portions 64, 68 are circular arcs of substantially the same curvature and the movement of the slidably rotatable member 52 consists of rotational movement about an axis of rotation, which passes through the center of curvature of the arcuate portion 64, of the outer surface 56 of the slidably rotatable member 52, as it slides on the arcuate portion 68. As will be appreciated, manufacturing tolerances do not always permit a well-defined surface to surface contact between two surfaces, therefore, it is preferable to define definite contact regions between the arcuate portions 64, 68 by providing abutment surfaces 68', 68" at the rear and forward extremities of the arcuate portion 68. Clearly, the abutment surfaces 68', 68" can be provided on the fixed inner wall 66 without an arcuate portion 68 between them. However, when the arcuate potion 64 of the slidably rotatable member 52 abuts the abutment surfaces 68', 68", on the fixed inner wall 66, there has to be a clearance between it and the region between the abutment surfaces 68', 68".

The abutment surfaces 68', 68", can be defined by designing the radius of curvature of the arcuate portion 68 of the fixed inner wall to be slightly different from that of the arcuate portion 64 of the outer surface of the slidably rotatable member 52. For example, the radius of curvature of the arcuate portion 68 of the fixed inner wall can be made slightly smaller than the radius of curvature of the arcuate portion 64 of the outer surface of the slidably rotatable member thereby forcing the contact regions between the arcuate portions 64, 68 to be at, or near, the extremities thereof. That is, a region of the rear extremity 64' of the arcuate portion 64 of the outer surface of the slidably rotatable member makes contact with a region of the rear extremity of the arcuate portion 68 of the fixed inner wall thereby forming a rear abutment surface 68' in a region of the rear extremity of the arcuate portion of the fixed inner wall 66. Similarly, a region of the forward extremity 64" of the arcuate portion 64 of the outer surface of the slidably rotatable member makes contact with a region of the forward extremity of the arcuate portion 68 of the fixed inner wall thereby forming a forward abutment surface 68" in a region of the forward extremity of the arcuate portion of the fixed inner wall 66.

Figure 6:
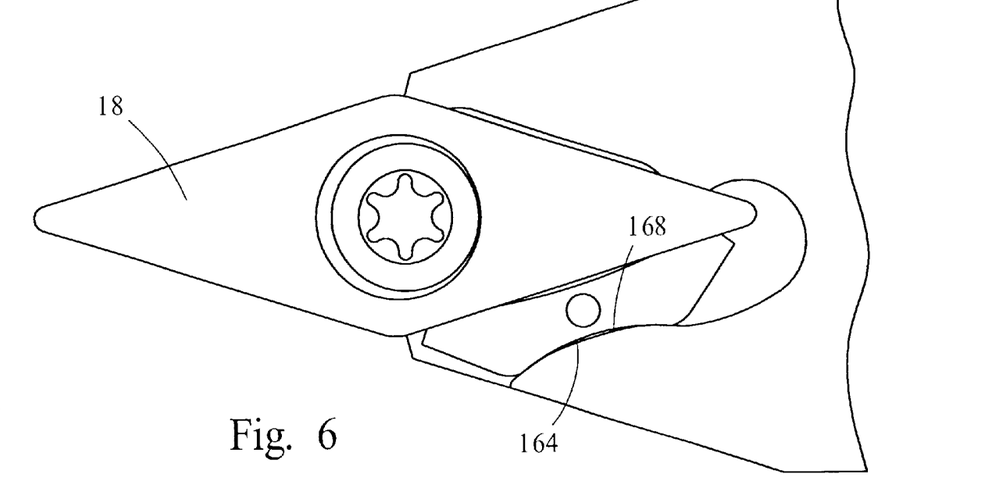
FIG. 6 is a top view of the cutting insert pocket of a cutting insert holder with a cutting insert retained therein, in accordance with a second embodiment of the present invention.
Figure 7:
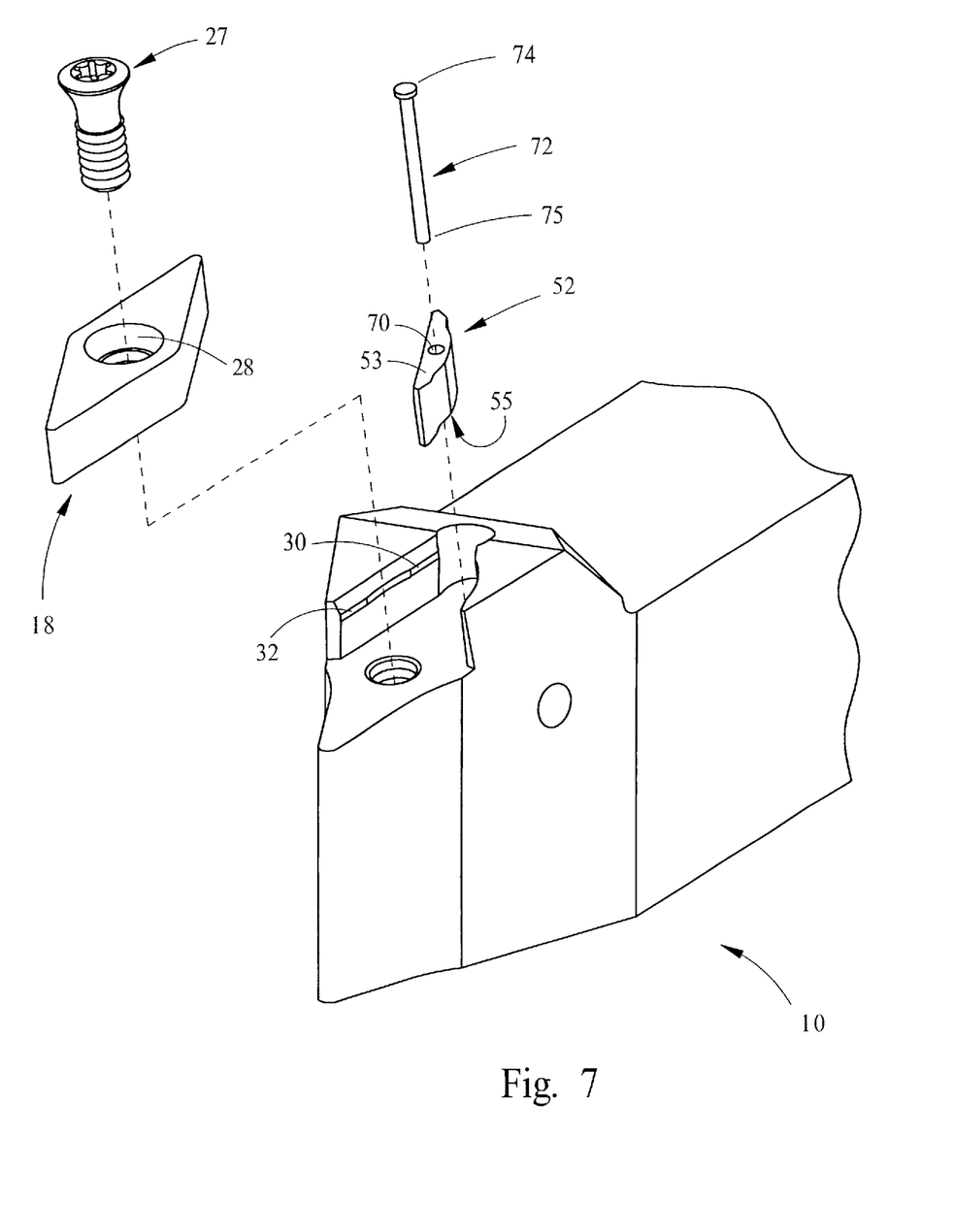
FIG. 7 is a partial exploded perspective view of a cutting tool assembly in accordance with a first embodiment of the present invention.
Figure 8:
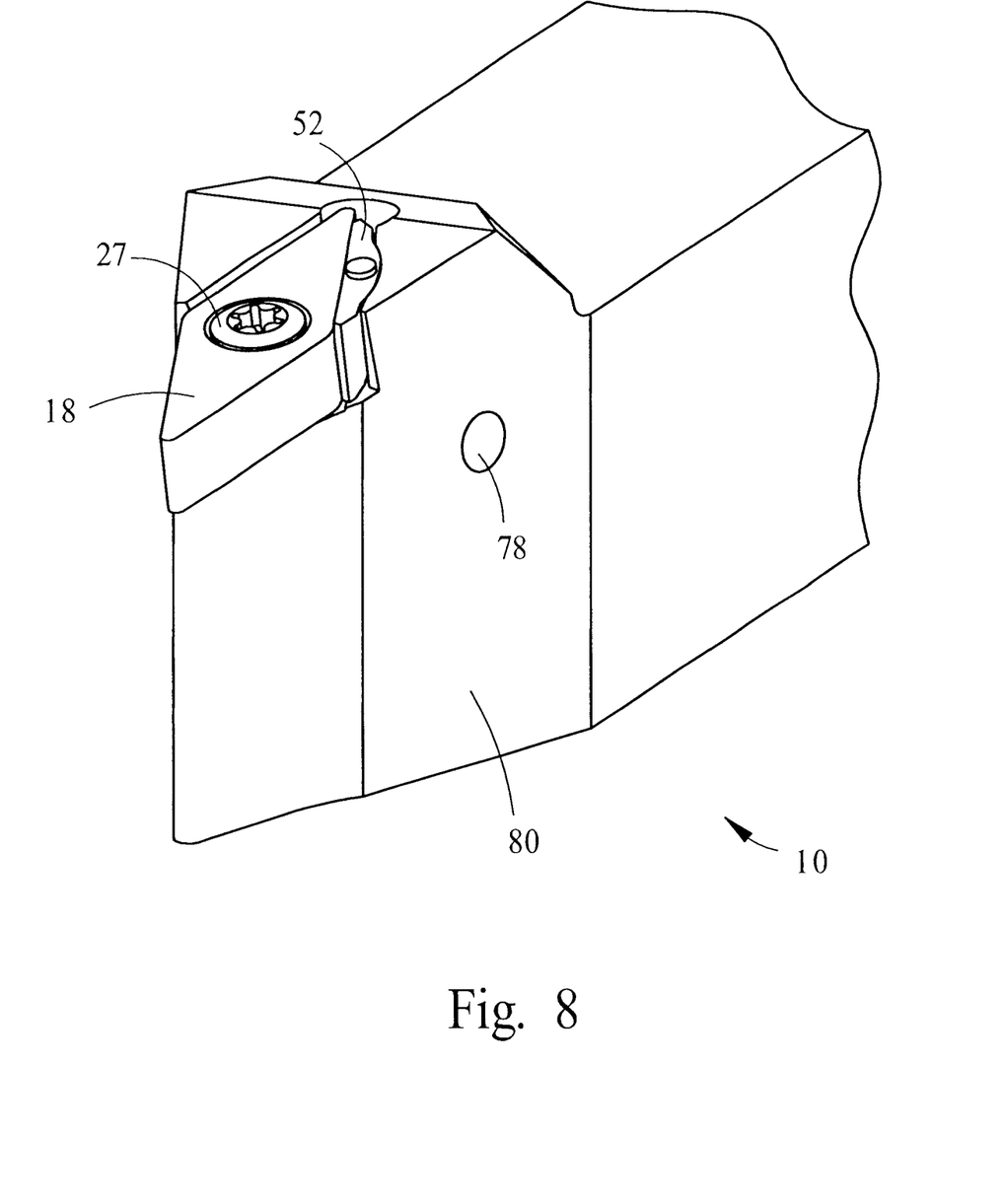
FIG. 8 is a partial perspective view of a cutting tool assembly in accordance with a first embodiment of the present invention.

FIG. 6 shows another embodiment of the present invention in which the arcuate portion 164 of the outer surface of the slidably rotatable member is concave and the arcuate portion 168 of the fixed inner wall is convex.

In order to enable rotational slidable movement of the slidably rotatable member 52 relative to the fixed inner wall 66 of the cutting insert pocket 50, as described above, but at the same time to ensure that the slidably rotatable member remains attached to the insert holder when replacing a cutting insert, or when no insert is present in the cutting insert pocket, the slidably rotatable member 52 is movably attached to the base 24 of the cutting insert pocket 50. In accordance with a specific application, the slidably rotatable member 52 is provided with a through bore 70, passing between the top 53 and bottom 55 surfaces thereof, for accepting a pin 72 having a pinhead 74. The base 24 of the cutting insert pocket has a bore 76 in the vicinity of the arcuate portion 68 of the fixed inner wall. When assembled, the pin 72 is located in the through bore 70 of the slidably rotatable member 52 and projects from the bottom thereof into the bore 76 in the base 24 of the cutting insert pocket. The diameter of the bore 76 in the base 24 of the cutting insert pocket is larger that the diameter of the pin 72 so that as the arcuate portion 64 of the slidably rotatable member 52 slides on the arcuate portion 68 of the fixed inner wall 66, the pin 72 freely moves inside the bore 76 in the base 24 of the cutting insert pocket. In order to anchor the pin 72 to the cutting insert holder 10 a transverse bore 78 is provided in a sidewall 80 thereof. The transverse bore 78 is designed to extend to the bore 76, in the base 24 of the cutting insert pocket 50, and to meet the bore 76 in the vicinity of the bottom end 75 of the pin 72. A trivial way, but by no means the only way, of anchoring the pin 72 to the cutting insert holder 10 is to bend the bottom end 75 of the pin so that the bent region enters the bore 78.

As mentioned above, the movement of the slidably rotatable member 52 consists of rotational movement about the center of curvature of the arcuate portion 64 of the slidably rotatable member 52 as it slides on the arcuate portion 68 of the fixed inner wall 66. It should be noted that the center of curvature of the arcuate portion 68 does not generally coincide with the bore 76 in the base 24 of the cutting insert pocket. Therefore, in general, the bore 76 in the base 24 of the cutting insert pocket does not constitute an axis of rotation of the slidably rotatable member 52.

In accordance with the present invention, the cutting insert pocket 50 is so designed that when the cutting insert 18 is securely retained therein, the two insert support sidewalls 20, 58 are angularly disposed to each other at the same angle that the adjacent abutted insert peripheral side surfaces 36, 38 are angularly disposed to each other. If the slidably rotatable member 52 was not slidably rotatable, then there would be, all in all, four fixed location surfaces giving rise to a generally ill defined cutting insert location system. However, since the second insert support sidewall 58 is rotatable, as described above, then when the cutting insert 18 is placed in the cutting insert pocket 50 and secured in position by means of the clamping screw 27, the cutting insert is urged towards the rear of the cutting insert pocket as the clamping screw is tightened so that the rear and forward insert location surfaces 30, 32 of the first insert support sidewall 20 abut the first insert peripheral side surface 36 and the slidably rotatable member 52 rotates until the rear and front insert location surfaces 60, 62 of the second insert support sidewall 58 (i.e., the inner surface 54 of the slidably rotatable member 52) abut the second insert peripheral side surface 38.

It should be noted that the fact that the second insert support sidewall 58 is rotatable enables four-point location (insert location surfaces 30, 32 and 60, 62) of the cutting insert in the cutting insert pocket 50 instead of the prior art three-point location, the result being precise repeatability of the location of the cutting edges and corner of the cutting insert each time a cutting insert is mounted in the cutting insert pocket. The cutting insert pocket should be so designed that the slidably rotatable member 52 can rotate sufficiently to bring the rear and front insert location surfaces 60, 62 of the second insert support sidewall 58 into abutment with the second insert peripheral side surface 38 of the cutting insert.

It should further be noted that four-point location of the cutting insert in the cutting insert pocket 50 provides a more rigidly secured cutting insert as compared to a three-point located cutting insert. More specifically, when, for example, a turning tool employing a cutting insert with four-point location support in accordance with the present invention is used and the direction of a turning operation is changed (e.g., from left to right) there will be negligible change in location of the cutting corner of the cutting insert. In contrast, when using a turning tool employing a cutting insert with three-point location support, in accordance with the prior art, the cutting corner of the cutting insert moves when the direction of a turning operation is changed due to the presence of the clearance 40 between the rear of the second insert support sidewall 22 and the second insert peripheral side surface 38 (see FIG. 2). Furthermore, vibration of the cutting insert is reduced considerably resulting in increased cutting life of the cutting insert. Still furthermore, the prior art three-point location of a cutting insert results in a small region of support (in the region of forward region 34, in FIGS. 1 and 2) of the second insert support sidewall (22 in FIG. 1). The four-point location mechanism of the present invention, on the other hand, effectively lengthens the region of support of the second insert support sidewall (58 in FIG. 4) since it has in addition to the front insert location surface 62 (which is equivalent to 34 of sidewall 22) the rear location surface 60.

There is described in U.S. Pat. No. 4,329,091 a floating wedge for use in conjunction with an indexable cutting tool. This reference does not constitute particularly relevant background to the present invention. However, it is cited here because of a superficial similarity that it bears to the slidably rotatable member of the present invention, and for the purpose of setting out the clear differences between the structure and function of the floating wedge described therein and the slidably rotatable member of the present invention. In US '091 the cutting insert is initially placed within the insert pocket. The insert is then securely mounted within the insert pocket by tightening the floating wedge within the pocket. This is done by inwardly rotating a differential screw. As the screw is inwardly rotated the floating wedge is shifted radially inwardly and both the axial and radial float are automatically varied until a parallel configuration is achieved between the leading surface (which may be considered as being equivalent to the second insert support sidewall 58 of the present invention) of the swivel plate member of the floating wedge, the cutting insert and the leading wall (which may be considered as being equivalent to the first insert support sidewall 20 of the present invention) of the insert pocket.

Simply put, US '091 relates to a configuration of an insert having opposed planar front and rear rake surfaces sandwiched in an insert pocket having parallel support walls. One of the parallel support walls being the leading surface of the swivel plate member of the floating wedge. As opposed to this, the present invention is directed to angularly disposed support walls. There is no suggestion in US '091 as to how the floating wedge can be used for nonparallel configurations. Furthermore, in the present invention the slidably rotational element is not shifted inwardly, or outwardly for that matter, by tightening a screw. In fact, the slidably rotational element of the present invention does not require the use of a screw at all in order to function. It is, not at all clear from US '091 how the floating wedge could function without a screw. Finally, in US '091, should the orientation of the insert tend to shift during a cutting operation, the orientation of the floating wedge will tend to shift along with the insert thereby maintaining the parallel configuration. This is in complete contrast to the slidably rotatable member of the present invention which, not only does not move once a cutting insert is clamped in position but which also prevents, or reduces considerably, shifting of the cutting insert during cutting operations.

Although the present invention has been described to a certain degree of particularity, it should be understood that various alterations and modifications can be made without departing from the spirit or scope of the invention as hereinafter claimed.

What is claimed is:

1. A cutting insert pocket in a cutting insert holder comprising:

two insert support sidewalls and a base transverse thereto, a first of the two insert support sidewalls being fixed relative to the base and having two coplanar spaced apart insert location surfaces, a second of the two insert support sidewalls being rotatable about an axis transverse to the base and having two coplanar spaced apart insert location surfaces, the two insert support sidewalls being angularly disposed to one another, the second insert support sidewall being the inner surface of a slidably rotatable member, the slidably rotatable member having an outer surface opposite the inner surface, wherein the cutting insert holder has a fixed inner wall provided with at least two spaced apart abutment surfaces that are in abutment with the outer surface of the slidably rotatable member.

2. The cutting insert pocket according to claim 1, wherein the outer surface of the slidably rotatable member has an arcuate portion that abuts the at least two spaced apart abutment surfaces enabling slidable rotational movement of the slidably rotatable member relative to the fixed inner wall of the insert holder.

3. The cutting insert pocket according to claim 1, wherein the outer surface of the slidably rotatable member has an arcuate portion with a first radius of curvature and the fixed inner wall has an arcuate portion with a second radius of curvature, the arcuate portion of the outer surface of the slidably rotatable member being in abutment with the arcuate portion of the fixed inner wall enabling slidably rotational movement of the slidably rotatable member relative to the fixed inner wall of the cutting insert pocket.

4. The cutting insert pocket according to claim 3, wherein the first radius of curvature is larger than the second radius of curvature.

5. The cutting insert pocket according to either of claims 3 or 4, wherein the arcuate portion of the outer surface of the slidably rotatable member is convex and the arcuate portion of the fixed inner wall is concave.

6. The cutting insert pocket according to either of claims 3 or 4, wherein the arcuate portion of the outer surface of the slidably rotatable member is concave and the arcuate portion of the fixed inner wall is convex.

7. The cutting insert pocket according to claim 1, wherein the slidably rotatable member is provided with a through bore and the base of the cutting insert pocket is provided with a bore, the slidably rotatable member being attached to the base of the cutting insert pocket by means of a pin which passes through the through bore and which projects from the slidably rotatable member into the bore.

8. The cutting insert pocket according to claim 7, wherein the bore in the base of the cutting insert pocket has a first diameter and the through bore in the slidably rotatable member has a second diameter, the first diameter being greater than the second diameter.

9. A cutting tool assembly comprising a cutting insert holder having a cutting insert pocket and a cutting insert retained therein, the cutting insert having at least two angularly disposed insert peripheral side surfaces, the cutting insert pocket comprising:

a slidably rotatable member having an inner surface and an opposite outer surface;

two insert support sidewalls and a base transverse thereto, a first of the two insert support sidewalls being fixed relative to the base and having two coplanar spaced apart insert location surfaces, a second of the two insert support sidewalls being slidably rotatable relative to a fixed inner wall of the cutting insert pocket and having two coplanar spaced apart insert location surfaces, the fixed inner wall being provided with at least two spaced apart abutment surfaces that are in abutment with the outer surface of the slidably rotatable member, the two insert support sidewalls being angularly disposed one to the other, the second insert support sidewall being the inner surface of the slidably rotatable member;

wherein the cutting insert is retained in the cutting insert pocket with the two coplanar spaced apart insert location surfaces of the first insert support sidewall abutting one insert peripheral side surface and the two coplanar spaced apart insert location surfaces of the second insert support sidewall abutting the other insert peripheral side surface, the slidably rotatable member being fixed in position between the cutting insert and the fixed inner wall adjacent the outer surface of the slidably rotatable member.

10. The cutting tool assembly according to claim 9, wherein the outer surface of the slidably rotatable member has an arcuate portion that abuts the at least two spaced apart abutment surfaces enabling slidable rotational movement of the slidably rotatable member relative to the fixed inner wall of the insert holder.

11. The cutting tool assembly according to claim 9, wherein the outer surface of the slidably rotatable member has an arcuate portion with a first radius of curvature and the fixed inner wall has an arcuate portion with a second radius of curvature, the arcuate portion of the outer surface of the slidably rotatable member being in abutment with the arcuate portion of the fixed inner wall enabling slidably rotational movement of the slidably rotatable member relative to the fixed inner wall of the cutting insert pocket.

12. The cutting tool assembly according to claim 11, wherein the first radius of curvature is larger than the second radius of curvature.

13. The cutting tool assembly according to either of claims 11 or 12, wherein the arcuate portion of the outer surface of the slidably rotatable member is convex and the arcuate portion of the fixed inner wall is concave.

14. The cutting tool assembly according to either of claims 11 or 12, wherein the arcuate portion of the fixed inner wall is convex.

15. The cutting tool assembly according to claim 9, wherein the slidably rotatable member is provided with a through bore and the base of the cutting insert pocket is provided with a bore, the slidably rotatable member being attached to the base of the cutting insert pocket by means of a pin which passes through the through bore and which projects from the slidably rotatable member into the bore.

16. The cutting tool assembly according to claim 15, wherein the bore in the base of the cutting insert pocket has a first diameter and the through bore in the slidably rotatable member has a second diameter, the first diameter being greater than the second diameter.

17. A method for assembling a cutting tool assembly comprising a cutting insert holder and a cutting insert, comprising the steps of:

(i) providing a cutting insert holder having a cutting insert pocket, the cutting insert pocket comprising:

a slidably rotatable member having an inner surface and an opposite outer surface;

two insert support sidewalls and a base transverse thereto, a first of the two insert support sidewalls being fixed relative to the base and having two coplanar spaced apart insert location surfaces, a second of the two insert support sidewalls being slidably rotatable relative to a fixed inner wall of the cutting insert pocket and having two coplanar spaced apart insert location surfaces, the fixed inner wall being provided with at least two spaced apart abutment surfaces that are in abutment with the outer surface of the slidably rotatable member, the two insert support sidewalls being angularly disposed to one another, the second insert support sidewall being the inner surface of the slidably rotatable member, the two insert support sidewalls being angularly disposed to one another at a first angular disposition; and (ii) providing a cutting insert to be retained in the cutting insert holder, the cutting insert having at least two angularly disposed insert peripheral side surfaces being disposed at a second angular disposition;

(iii) positioning the cutting insert in the cutting insert pocket with the two coplanar spaced apart insert location surfaces of the first insert support sidewall adjacent one insert peripheral side surface and the two coplanar spaced apart insert location surfaces of the second insert support sidewall adjacent the other insert peripheral side surface;

(iv) inserting a clamping screw in a through bore in the cutting insert until the clamping screw mates with a threaded bore in the base of the cutting insert pocket;

(v) screwing the clamping screw into the threaded bore in the base of the cutting insert pocket, whereby the slidably rotatable member becomes fixed in position between the cutting insert and the fixed inner wall adjacent the outer surface of the slidably rotatable member and the two coplanar spaced apart insert location surfaces of the first insert support sidewall abut one insert peripheral side surface and the two coplanar spaced apart insert location surfaces of the second insert support sidewall abut the other insert peripheral side surface.

18. The method for assembling a cutting tool assembly according to claim 17, wherein the outer surface of the slidably rotatable member has an arcuate portion with a first radius of curvature and the fixed inner wall has an arcuate portion with a second radius of curvature, the arcuate portion of the outer surface of the slidably rotatable member being in abutment with the arcuate portion of the fixed inner wall enabling slidably rotational movement of the slidably rotatable member relative to the fixed inner wall of the cutting insert pocket.

19. The method for assembling a cutting tool assembly according to claim 18, wherein the first radius of curvature is larger than the second radius of curvature.

20. The method for assembling a cutting tool assembly according to either of claims 18 or 19 wherein the arcuate portion of the outer surface of the slidably rotatable member is convex and the arcuate portion of the fixed inner wall is concave.

21. The method for assembling a cutting tool assembly according to claim 18, wherein the arcuate portion of the outer surface of the slidably rotatable member is concave and the arcuate portion of the fixed inner wall is convex.

22. The method for assembling a cutting tool assembly according to claim 17, wherein the slidably rotatable member is provided with a through bore and the base of the cutting insert pocket is provided with a bore, the slidably rotatable member being attached to the base of the cutting insert pocket by means of a pin which passes through the through bore and which projects from the slidably rotatable member into the bore.

23. The method for assembling a cutting tool assembly according to claim 22, wherein the bore in the base of the cutting insert pocket has a first diameter and the through bore in the slidably rotatable member has a second diameter, the first diameter being greater than the second diameter.

24. A cutting tool holder having a cutting insert pocket, said cutting insert pocket comprising:

first and second insert support sidewalls and a base transverse thereto;

a first of the two insert support sidewalls being fixed relative to the base and having a first pair of coplanar spaced apart insert location surfaces;

a second of the two insert support sidewalls being rotatable about an axis transverse to the base and having a second pair of coplanar spaced apart insert location surfaces, the two insert support sidewalls being angularly disposed to one another, the second insert support sidewall being the inner surface of a slidably rotatable member, the slidably rotatable member having an outer surface opposite the inner surface and a through bore offset from an imaginary plane containing the second pair of coplanar spaced apart insert location surfaces, a projection of the through bore on the imaginary plane falling between the two-spaced apart insert location surfaces; wherein the first and second pairs of coplanar spaced apart insert location surfaces are arranged to simultaneously abut a cutting insert at first and second pairs of spaced apart locations to thereby provide at least four points of contact, when the cutting insert is seated in the cutting insert pocket.

25. A cutting tool assembly comprising:

a cutting tool holder having a cutting insert pocket, said cutting insert pocket comprising:

first and second insert support sidewalls and a base transverse thereto;

a first of the two insert support sidewalls being fixed relative to the base and having a first pair of coplanar spaced apart insert location surfaces;

a second of the two insert support sidewalls being rotatable about an axis transverse to the base and having a second pair of coplanar spaced apart insert location surfaces, the two insert support sidewalls being angularly disposed to one another, the second insert support sidewall being the inner surface of a slidably rotatable member, the slidably rotatable member having an outer surface opposite the inner surface and a through bore offset from an imaginary plane containing the second pair of coplanar spaced apart insert location surfaces, a projection of the through bore on the imaginary plane falling between the two-spaced apart insert location surfaces; and a cutting insert seated in the cutting insert pocket with the first and second pairs of coplanar spaced apart insert location surfaces simultaneously abutting the cutting insert at first and second pairs of spaced apart locations to thereby provide at least four points of contact between the first and second support sidewalls and the cutting insert.

\* \* \* \* \*